United States Patent
Koppenhoefer (10) Patent No.: US 7,188,552 B1
(45) Date of Patent: Mar. 13, 2007

(54) HOLDING SOCKET FOR A THREADED FASTENER

(75) Inventor: Peter Koppenhoefer, Portland, PA (US)

(73) Assignee: JETYD Corp., Mahwah, NJ (US)

( * ) Notice: Subject to any disclaimer, the term of this patent is extended or adjusted under 35 U.S.C. 154(b) by 0 days.

(21) Appl. No.: 11/251,265

(22) Filed: Oct. 14, 2005

(51) Int. Cl.
*B25B 13/06* (2006.01)
*B25B 13/48* (2006.01)

(52) U.S. Cl. .............................. 81/125; 81/55
(58) Field of Classification Search ............. 81/125, 81/121.1, 13, 55
See application file for complete search history.

(56) References Cited

U.S. PATENT DOCUMENTS

| | | | | |
|---|---|---|---|---|
| 2,805,594 | A | * | 9/1957 | Fogel ........................ 81/125 |
| 3,277,749 | A | * | 10/1966 | Osburn et al. ............. 81/57.32 |
| 4,570,513 | A | * | 2/1986 | Thompson ................. 81/125 |
| 6,490,952 | B2 | * | 12/2002 | Junkers ..................... 81/57.39 |
| 6,609,868 | B2 | | 8/2003 | Junkers |
| 6,871,570 | B1 | * | 3/2005 | Santillan .................... 81/125 |
| 6,883,401 | B2 | | 4/2005 | Junkers |
| 6,889,581 | B2 | * | 5/2005 | Chen ......................... 81/125 |
| 2004/0163500 | A1 | * | 8/2004 | Walsh ........................ 81/125 |
| 2005/0066778 | A1 | * | 3/2005 | Chen ......................... 81/125 |
| 2006/0042423 | A1 | * | 3/2006 | Karol ....................... 81/121.1 |

FOREIGN PATENT DOCUMENTS

GB 2210306 A * 6/1989

* cited by examiner

*Primary Examiner*—David B. Thomas
(74) *Attorney, Agent, or Firm*—Michael J. Striker (57) ABSTRACT

A holding socket for a fastener having a nut arrangeable on a threaded element, and a washer located between the nut and an object, the holding socket has a body having two opposite ends with a first end connectable to a part of a power tool and a second end which is axially spaced from the first end and connectable with the washer so as to hold the washer against rotation, and a locking element located in an area of the second end of the body and displaceable transversely to the body between a position in which it is located axially between the second end of the body and the nut and therefore prevents a removal of the socket from a fastener and another position in which it is no longer located axially between the second end of the body and the nut, and therefore allows withdrawal of the socket from the fastener.

8 Claims, 8 Drawing Sheets

FIG. 17

HOLDING SOCKET FOR A THREADED FASTENER

BACKGROUND OF THE INVENTION

The present invention relates to a holding socket for a fastening device.

More particularly, it relates to a holding socket for a fastening device which includes a bolt and the like, a nut screwed on the bolt, and a washer located between the nut and an object and capable of holding the bolt rotation stationary but allowing the bolt to elongate or relax in an axial direction. A fastening device of the above mentioned general type is disclosed for example in our U.S. Pat. Nos. 6,609,868 and 6,883,401.

During the operation a driving socket connected to a driving part of a power tool engages the nut and turns it, while a holding socket connected to an immovable part of the power tool holds the washer to prevent it from turning. When this process takes place on a vertical assembly or in an inverted assembly, a means had to be found to hold the tool and the socket assembly in place, so that a tool operator would not have to hold the tool and the socket assembly in place. A safe, hand-free operation of the tool during tightening or loosening of the threaded fastener is needed.

SUMMARY OF THE INVENTION

Accordingly, it is an object of the present invention to provide a holding socket for a threaded fastener which avoids the disadvantages of the prior art and achieves the above mentioned advantageous results.

In keeping with these objects and with others which will become apparent hereinafter, one feature of the present invention resides, briefly stated, in a holding socket for a fastener having a nut arrangeable on a threaded element, and a washer located between the nut and an object, the holding socket comprising a body having two opposite ends with a first end connectable to a part of a power tool and a second end which is axially spaced from said first end and connectable with the washer so as to hold the washer against rotation; and a locking element located in an area of said second end of said body and displaceable transversely to said body between a position in which it is located axially between said second end of said body and the nut and therefore prevents a removal of the socket from a fastener and another position in which it is no longer located axially between said second end of said body and the nut, and therefore allows withdrawal of the socket from the fastener.

When the holding socket is designed in accordance with the present invention, the means are provided to hold the tool, the driving socket and the holding socket securely to the washer-nut assembly, without making the installation and disassembly of the tool a different task.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
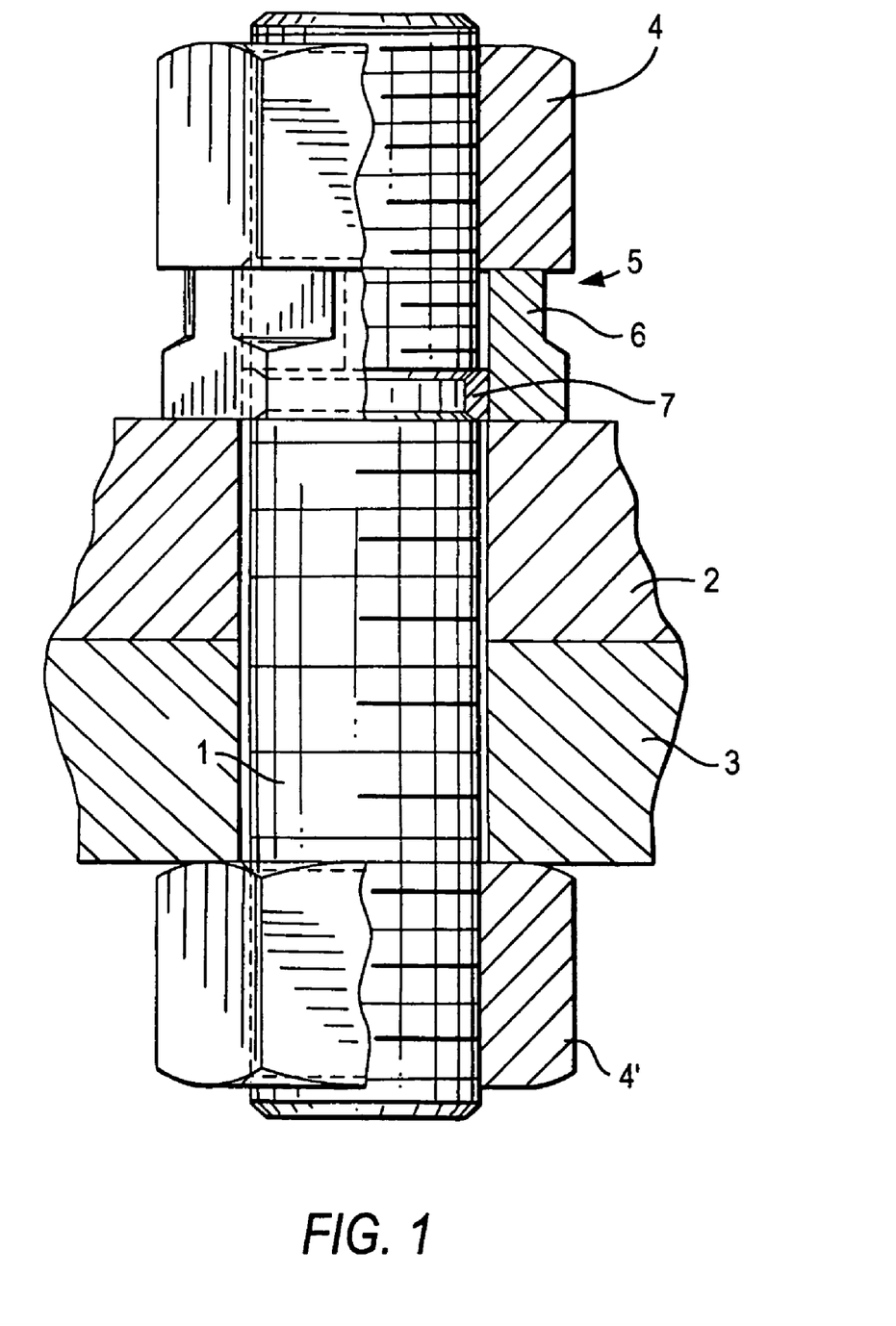
FIG. 1 is a view showing a fastening assembly for connecting tool for example for connecting two parts of an object with one another.
Figure 2A:
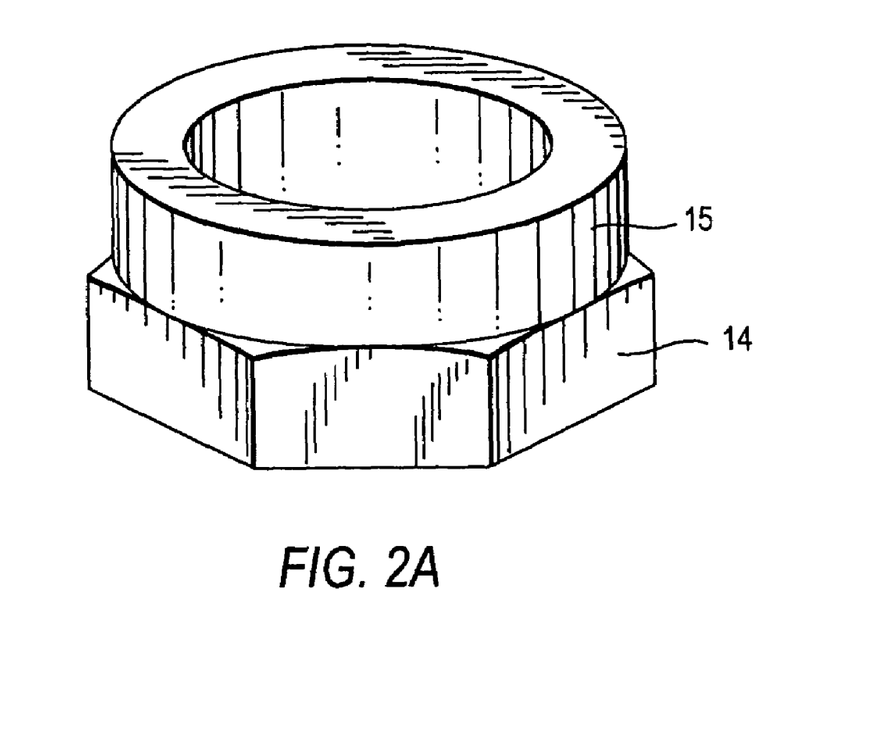
FIGS. 2a and 2b are a perspective view and a sectioned perspective view of a washer which is used in the fastening assembly of FIG. 1.
Figure 2B:
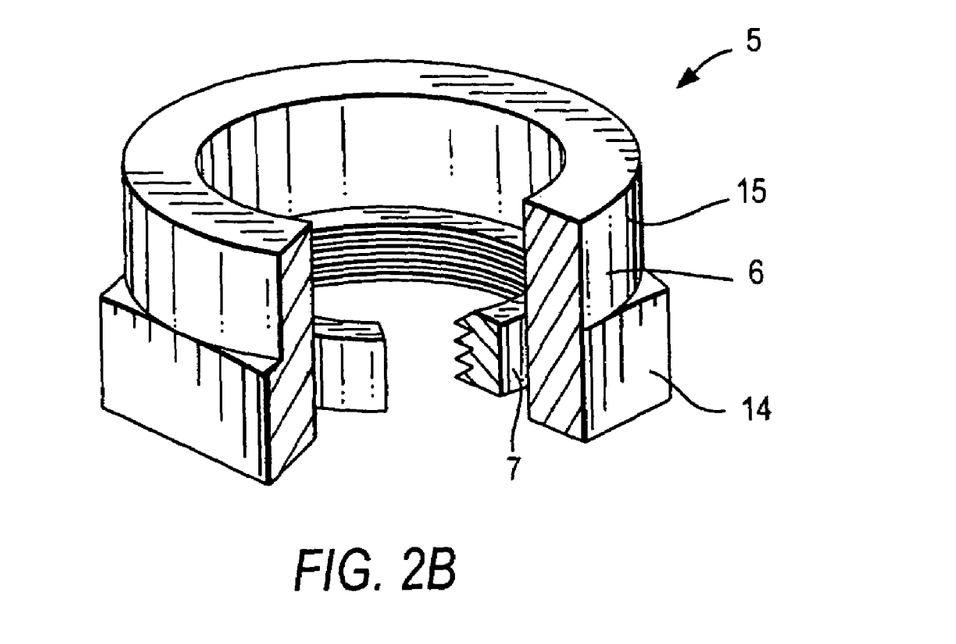
Figure 3:
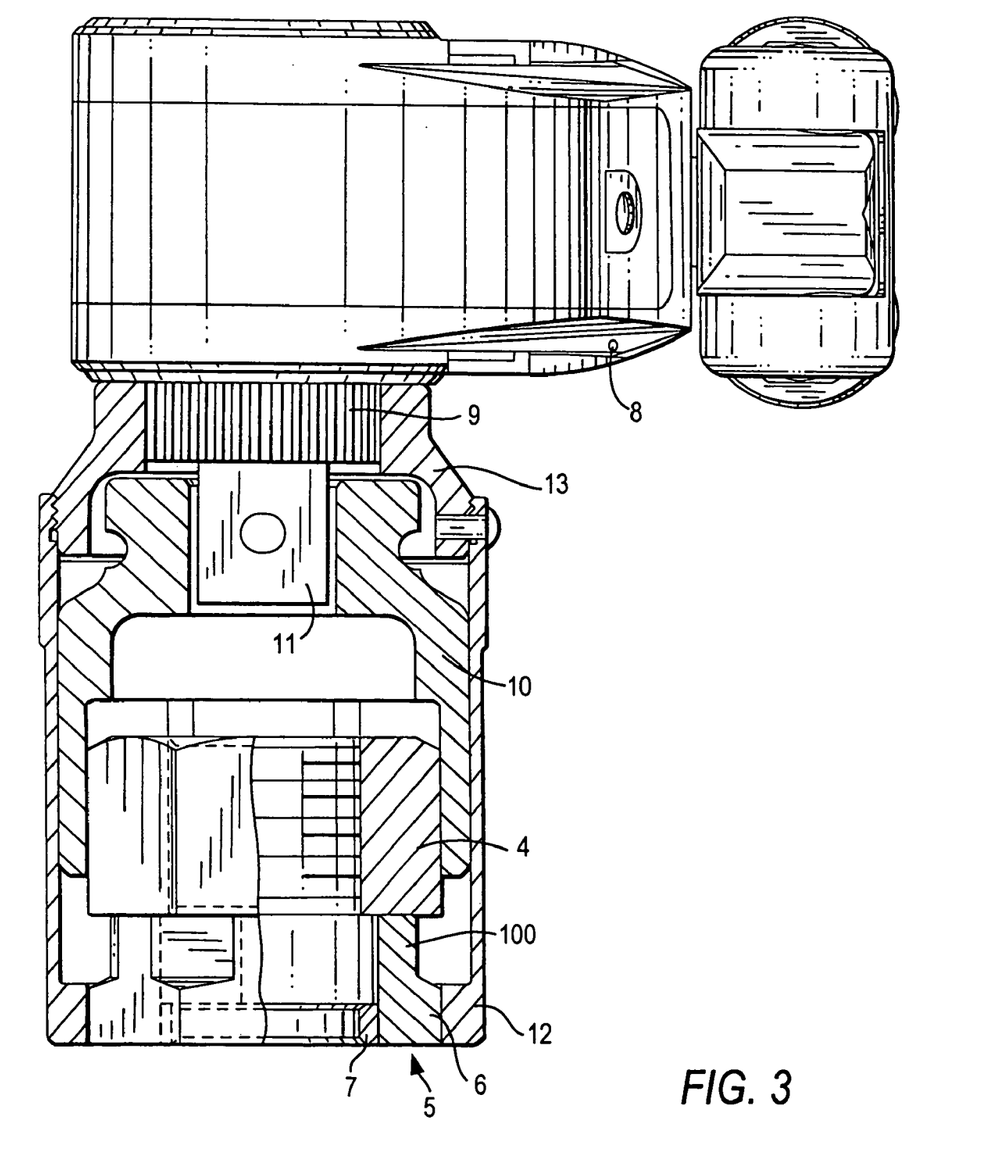
FIG. 3 is a view showing the fastening assembly with a power tool as well as a driving socket and a holding socket for tightening or loosening of the fastening assembly.

FIG. 1 is a view showing a fastening device for tightening or loosening a threaded connector. A fastening device has a threaded member which is identified with reference numeral 1 and formed as a bolt, a stud and the like. It extends through a lined openings in tool parts 2 and 3 of an object, to be connected with one another. A nut 4 is screwed on one end of the bolt 1, and a washer 5 is located between the nut 4 and the part 2 of the object. A nut 4' is screwed on an opposite threaded end of the bolt 1. As shown in FIGS. 2 and 3, the washer 5 is composed of an outer part 6 and an inner part 7 which are for example press-fit with one another, so that the inner part 7 can not turn relative to the outer part 6, but can move axially relative to the latter.

For tightening or loosening the assembly a power tool 8 is provided. Its driving element 9, for example an outer element of a ratchet-pawl mechanism, is connected with a driving socket 10 which engages the nut 4, for example by a connecting member 11. A holding socket 12 is connected with the power tool non-rotatably, for example through a connecting element 13 having inner splines slidingly cooperating with the outer splines of the driving element 9. The holding socket 12 has an opposite end 13 which non-rotatably engages with the washer 5, for example through interengaging splines.

During the operation of the power tool, the driving socket 10 is turned and turns the nut 4 on the bolt 1, while the holding socket 12 holds the outer part 6 of the washer 5 non-turnably, so that the inner part 7 of the washer does not turn and prevent the bolt from turning, while allowing the bolt together with the inner part 7 to displace axially to be tightened or loosened.

This is essentially disclosed in the patent documents mentioned herein above. When the tightening process is concluded, the corners of the nut 4 and the corners of the hexagonal part 6 of the washer may be at random, or in other words not aligned, and therefore it would be impossible to remove the holding socket. In accordance with the present invention the holding socket 12 is provided with a locking device which allows a removal of the holding socket in the above described situation and is also used to secure the tool and the socket assembly to the nut 4-washer 5 unit.

The washer 5, in particular its outer part 6 for this purpose has a hexagonal portion 14 engageable by the end part of the holding socket 12, and a portion 15 of a smaller transverse size, preferably formed as a round, reduced portion of a reduced cross-section.

The locking device which is identified with reference numeral 21 has a plurality of segments, for example three segments 22, 23, and 24. The segments 22 and 23 are pivotally connected with the segment 24, for example through hinges. At the opposite ends the segments 22 and 23 have actuating means which can be formed, for example, as lugs 25 arranged to extend outwardly beyond an opening 26 in the holding socket 12.

Figure 4:
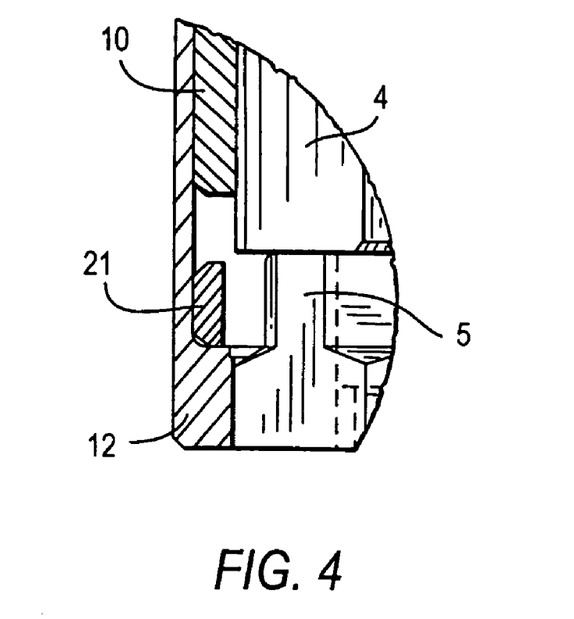
FIG. 4 is a view showing a section of the fastening assembly with a locking device in accordance with the present invention in a locked open position.
Figure 5:
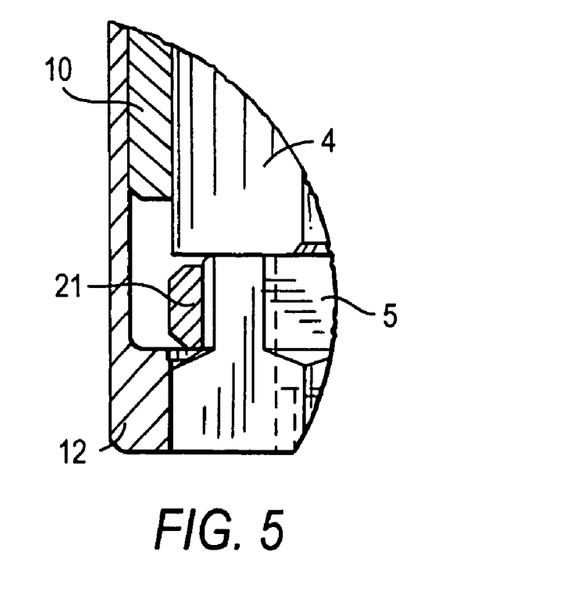
FIGS. 5 and 6 are views substantially corresponding to the view of FIG. 4 but showing the locking device in a locked closed position for a regular arrangement and for an inverted arrangement correspondingly.
Figure 6:
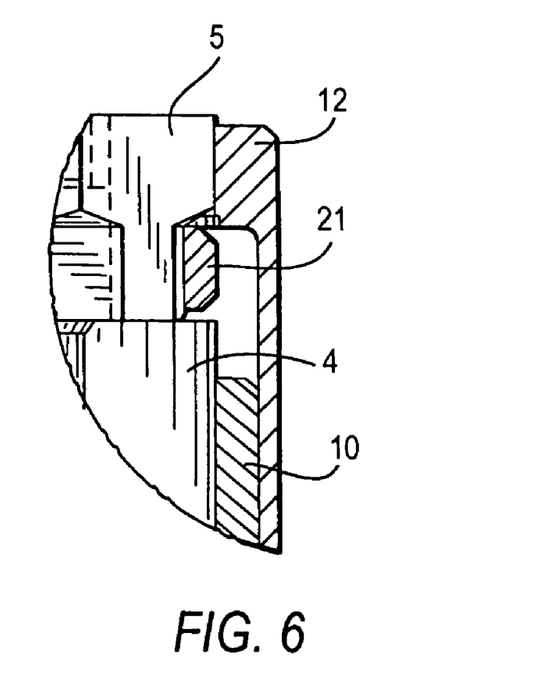
Figure 7:
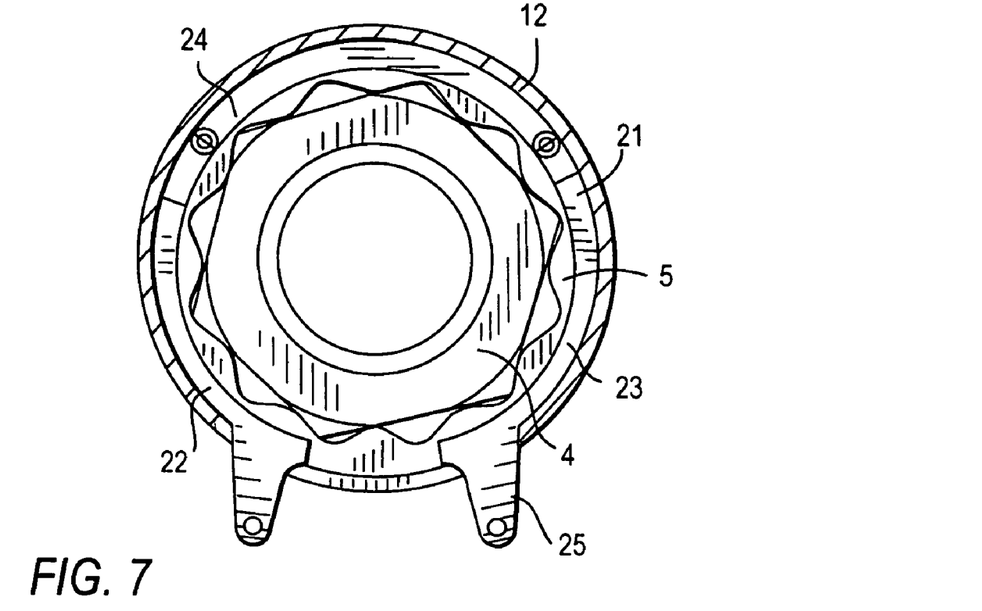
FIGS. 7 and 8 are views showing the locking device in a locked open position and a locked closed position.
Figure 8:
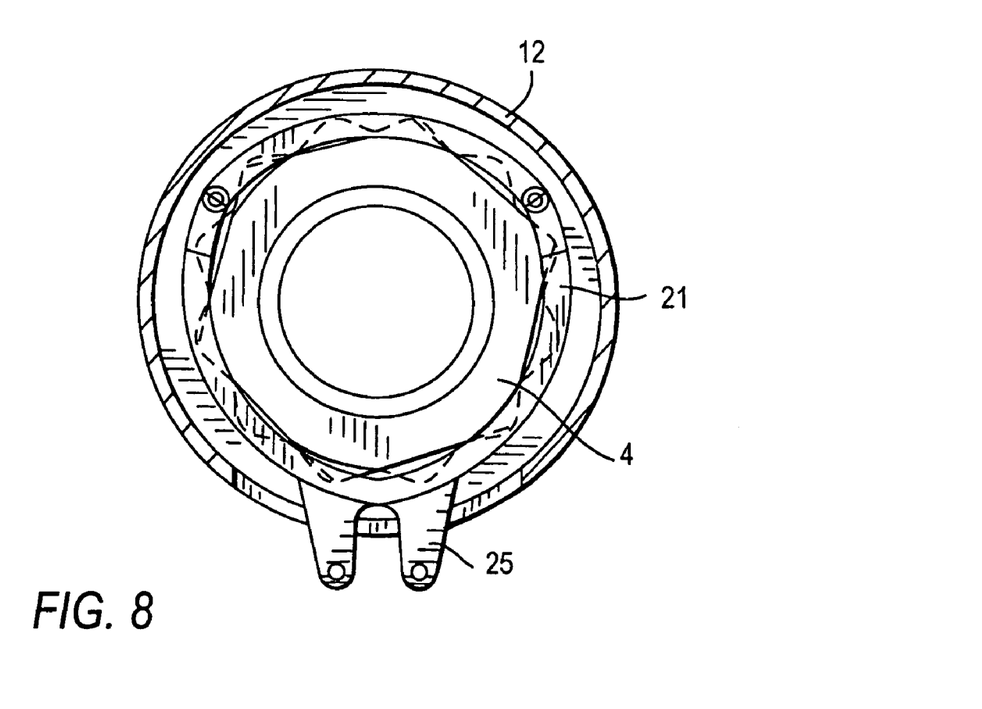

In a locked open position shown in FIGS. 4 and 7 the lugs 25 are spread away from one another, and the segments 22, 23 and 24 are expanded and thereby located radially outwardly beyond the corners of the hexagonal contours of the nut 4 and the washer 5. When the lugs 25 are moved by the operator to the locked closed position shown in FIGS. 5, 6 and 8, the segments 22, 23, 24 are displaced radially inwardly into the space provided by the reduced cylindrical portion 15 of the washer 5 and located between the hexagonal contours of the nut 4 and the washer 5. Therefore the holding socket is reliably held on the washer and the power tool is held on the fastening assembly.

Figure 9:
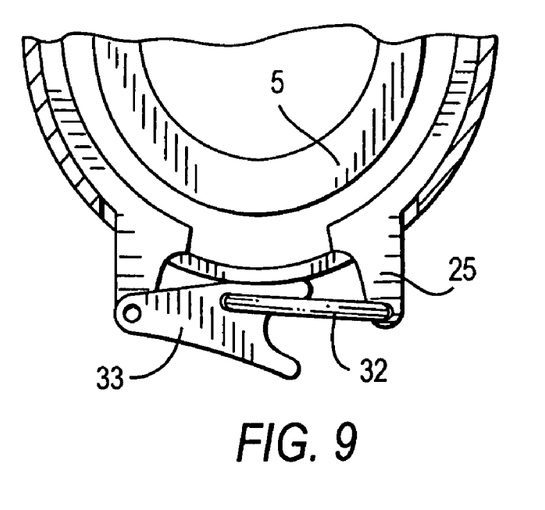
FIGS. 9 and 10 are views showing actuating means extending outside of the holding socket in the locked open position of the locking device.
Figure 10:
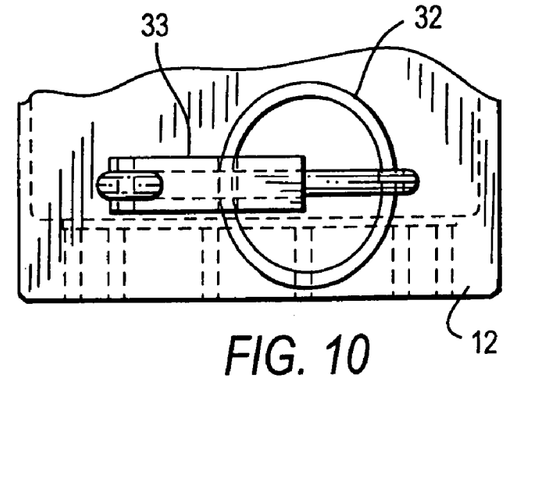
Figure 11:
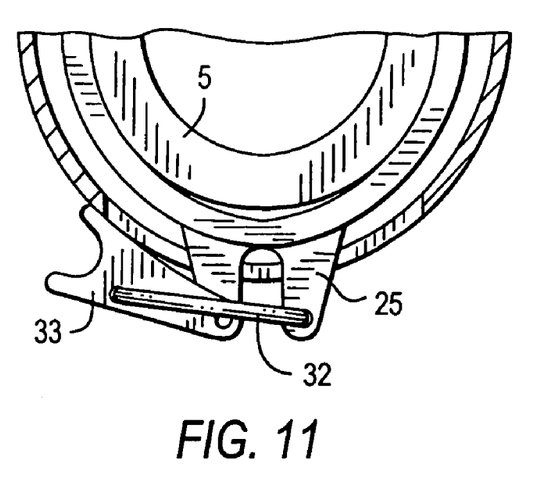
FIGS. 11 and 12 are views substantially corresponding to the views of FIGS. 9 and 10 but showing the actuating means in the locked closed position of the locking device.
Figure 12:
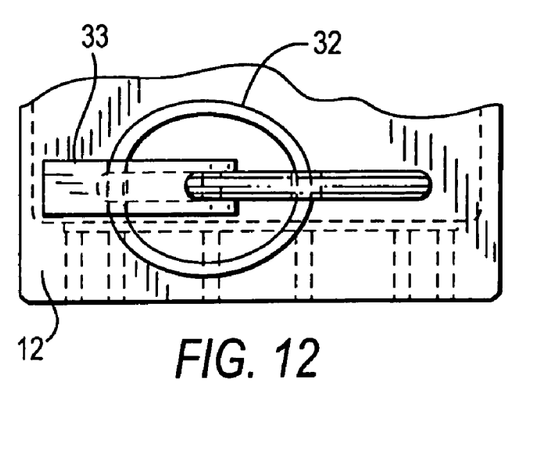
Figure 13:
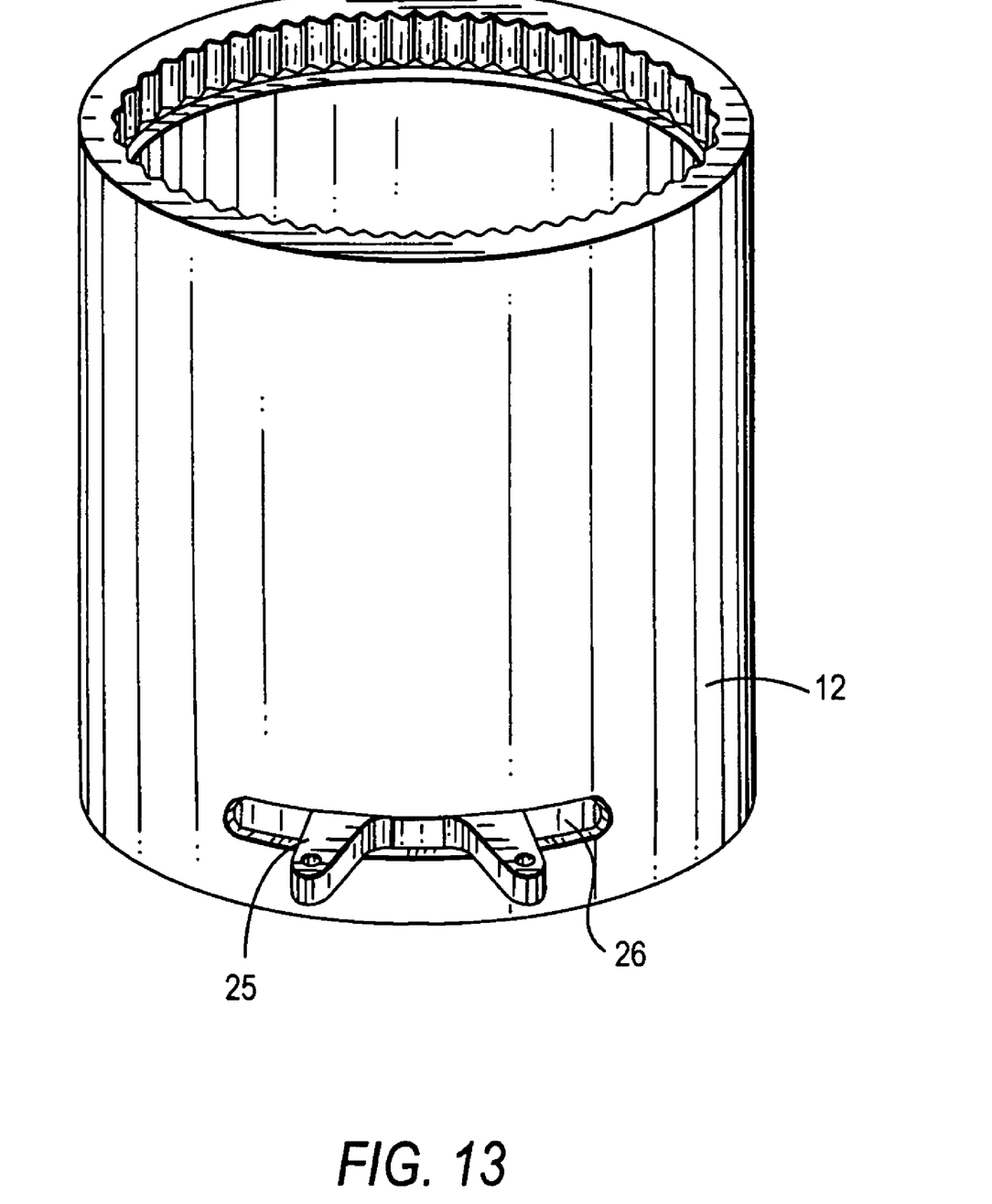
FIG. 13 is a perspective view of the holding socket in accordance with the present invention with the actuating means extending outside the socket.
Figure 14:
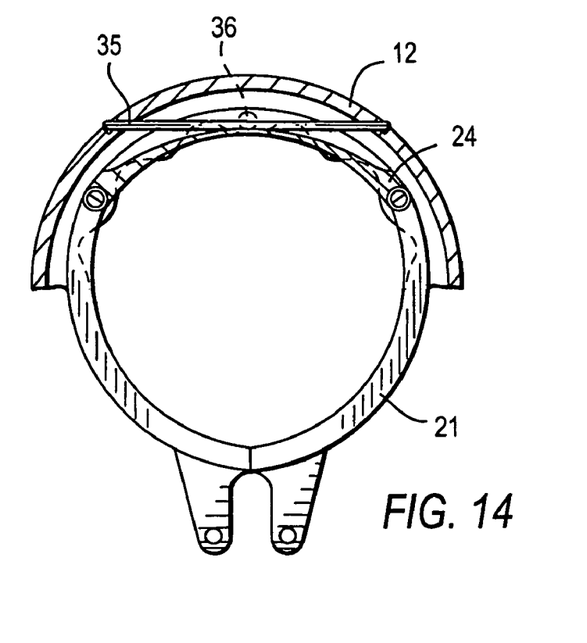
FIGS. 14 and 15 are views showing a transverse section and a vertical section illustrating stabilizing means of the holding socket in the closed position of the locking device.
Figure 15:
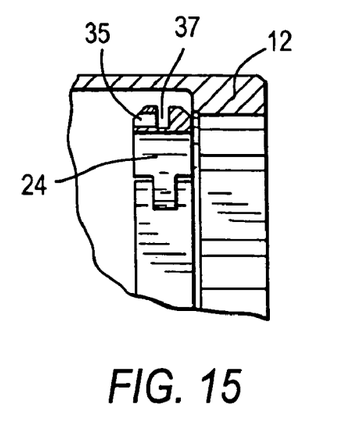
Figure 16:
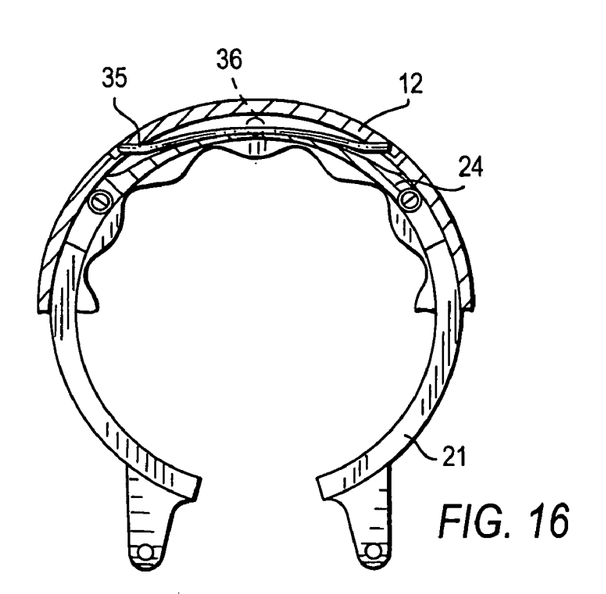
FIGS. 16 and 17 are views substantially corresponding to the views of FIGS. 14 and 15 but showing the stabilizing means in the open position of the locking device.
Figure 17:
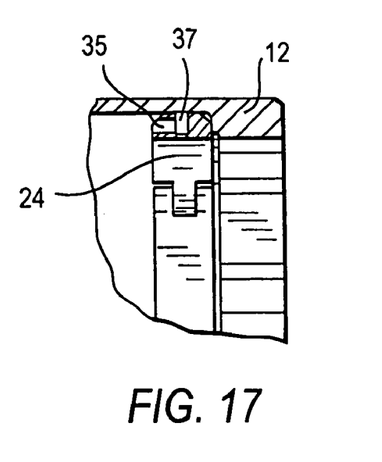

Means are provided for holding the actuating lugs 25 in a positions corresponding to the locked open position and locked closed position of the locking device, as shown in FIGS. 9–12. This means are identified as a whole with reference numeral 31 and include a flexible link 32 and a turnable link 33. When the turnable link 33 is turned to the right as shown in FIGS. 9 and 10, the lugs 25 are spread apart and move the segments 22, 23, 24 of the locking device 21 to the locked open position. When the turnable link 33 is pivoted to the left as shown in FIGS. 11 and 12, the lugs 25 are pushed toward one another so that the segments 22, 23, 24 of the locking device 21 assumes the locked closed position.

Stabilizing means are further provided as identified with reference numeral 34 in FIGS. 14–17. The stabilizing means 34 include a flexible stabilizing wire 35 which holds the segment 24 in axial and radial position. The segment 24 is fastened by a set screw 36 to the stabilizing wire 35 to maintain the axial position. The stabilizing wire 35 is located in the same axial position. The stabilizing wire 35 is assembled in the holding socket by deforming or bending of each end to prevent the stabilizing wire 35 from moving side-by-side, but yet to allow it to bend when the locking device is moved to the locked open position shown in FIG. 10. In the locked open position the stabilizing wire 35 is contained in a central slot 37 in the segment 24 of the locking device 21.

It will be understood that each of the elements described above, or two or more together, may also find a useful application in other types of constructions differing from the types described above.

While the invention has been illustrated and described as embodied in a holding socket for a threaded fastener, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A holding socket for a fastener having a nut arrangeable on a threaded element, and a washer located between the nut and an object, the holding socket comprising a body having two opposite ends with a first end connectable to a part of a power tool and a second end which is axially spaced from said first end and connectable with the washer so as to hold the washer against rotation; and a locking element located in an area of said second end of said body and displaceable transversely to said body between a position in which it is located axially between said second end of said body and the nut and therefore prevents a removal of the socket from a fastener and another position in which it is no longer located axially between said second end of said body and the nut, and therefore allows withdrawal of the socket from the fastener.

2. A holding socket as defined in claim 1; and further comprising means for holding said locking element in said closed position and in said open position.

3. A holding socket as defined in claim 2, wherein said holding means include a flexible element movable between a first position in which it holds said locking element in said closed position and a second position in which it holds said flexible element in said open position.

4. A holding socket as defined in claim 1, wherein said actuating means include at least one element extending outwardly beyond said body.

5. A holding socket as defined in claim 1; and further comprising means for holding said locking element immovable in an axial direction.

6. A holding socket as defined in claim 5, wherein said means for holding said locking element immovable in an axial direction include an elastic member which engages with said locking element in said locked position.

7. A holding socket as defined in claim 1, wherein said locking element is composed of a plurality of locking members pivotally connected with one another.

8. A holding socket as defined in claim 1, wherein said locking element has projections extending outwardly beyond said body and forming actuating means for displacing said locking element between said positions.

* * * * *